3,179,488
METHOD OF TREATING EXHAUST GASES OF INTERNAL COMBUSTION ENGINES

Herbert R. Appell, Pitcairn, Pa., assignor to Koppers Company, Inc., a corporation of Delaware
No Drawing. Filed Dec. 13, 1961, Ser. No. 159,490
1 Claim. (Cl. 23—2)

This invention relates generally to catalytic compositions and more particularly to catalytic compositions useful in oxidation reactions.

The exhausts from automobiles and the waste gases from industrial activity have, in some locations, caused serious health hazards for both humans and animals by polluting the atmosphere with noxious and toxic gases. These gases usually contain small percentages of hydrocarbons, partially oxidized hydrocarbons, and by-products from chemical reactations. Many localities have passed stringent regulations to control the amount of foreign materials which are introduced into the air from such sources.

This invention, therefore, provides novel catalysts for the oxidation of hydrocarbons or partial oxidation products of hydrocarbons to carbon dioxide and water, thereby eliminating the release of toxic gases into the atmosphere.

An oxidation catalyst for such purpose must be easily activated, and must be effective and stable over a wide temperature range. The catalysts that have been prepared heretofore suffer from low activity, sensitivity to water vapor, high cost or a combination of these disadvantages.

Cobalt, iron, copper and nickel are well known as oxidation catalysts but are not sufficiently active to be useful in removing dilute hydrocarbons or partially oxidized hydrocarbons from air.

Quite surprisingly, I have discovered that barium oxide is a powerful promoter for the oxides of cobalt, iron, nickel and copper.

In accordance with this invention, a catalyst is furnished for the oxidation of dilute hydrocarbons and partially oxygenated hydrocarbons in air comprising in major proportion the oxides of nickel, cobalt, copper and iron, in conjunction with minor amounts of a carrier, such as, magnesium oxide and zirconium oxide, which is promoted by barium oxide in minor proportion.

The catalyst compositions may be prepared by co-precipitation, dry mixing and pelleting, by impregnation or by other techniques employed in the art. Excellent results have been obtained by the coprecipitation of the active component with a difficultly reducible oxide, such as zirconia, followed by drying and then impregnation with a solution of barium hydroxide. In place of barium hydroxide, other salts, such as, barium acetate, barium nitrate, or other compounds which are converted to the oxide during preparation may be substituted.

The catalytic oxides of this invention may be advantageously used in combination with supports. Zirconia, alumina, magnesia, silica, and similar bases, either alone or in combination, may be effective in increasing the surface area of the catalysts thereby increasing their effectiveness. The supports may also serve to stabilize the catalyst against sintering as is well known in the art.

These catalytic compositions are used to advantage in internal combustion engine mufflers. This is especially true because of their high activity at moderate temperatures. The time required to bring the catalyst up to working temperature is materially shortened using these compositions.

The hydrocarbon content of engine exhaust fumes varies over a very wide range. A catalyst for maximum usefulness must be active with very dilute concentrations of pollutants. My catalyst compositions are effective with very low exhaust hydrocarbon contents. The higher the hydrocarbon or oxygenated hydrocarbon content, the easier it is to oxidize them up to a point at which there is insufficient oxygen in the system to combine with the available carbon and hydrogen. My catalysts are most effective when the concentration of hydrocarbons passing over the catalyst is up to one percent.

These catalysts have the added advantage that they will not be poisoned by the deposition of barium and calcium with which they might come into contact.

The examples illustrate the preparation of various catalysts useful in this invention. The catalyst compositions are described as percent by weight. The total is 100%.

Example I

A solution of 35 grams of copper sulfate and 1.3 grams of zirconium nitrate in 200 ml. of water was precipitated by the addition of a solution of 3:1 potassium hydroxide to potassium carbonate until the pH of the solution reached 8 or 9. The precipitate was filtered, washed with water, and air dried at 250° C. for one hour. The composition of the catalyst was 95% copper oxide and 5% zirconium oxide. The catalyst was tested according to a later described procedure at 250° C. A conversion of 14.5% of hydrocarbon to carbon dioxide was obtained.

Example II

The details of this experiment are the same as in Example I except that the dried catalyst was impregnated with sufficient barium hydroxide solution to add 5% barium oxide to the catalyst. The catalyst composition was 90% copper oxide, 5% zirconium oxide, and 5% barium oxide. After drying for one hour at 250° C., the catalyst was evaluated at 200° C. A 52% conversion of hydrocarbon to carbon dioxide was obtained with the barium oxide promoted catalyst.

Example III

This experiment was the same as that described in Example II except that the catalyst was dried at 350° C. A conversion of 72% of the hydrocarbon was converted to carbon dioxide.

Example IV

A solution of 16.6 grams of cobaltous acetate and 0.6 gram of zirconium nitrate in 200 ml. of water was precipitated by the addition of an aqueous solution of 35% potassium hydroxide until the pH of the solution reached 8 or 9. After filtering and washing with water, the precipitate was air dried for one hour at 250° C. The composition of the catalyst was 95% cobalt oxide and 5% zirconium oxide. The catalyst was evaluated at 250° C. A 57.8% conversion of sec-butyl benzene to carbon dioxide was achieved.

Example V

The details of this experiment were the same as in Example IV except that the catalyst was dried at 350° C. When tested at 250° C., a 25.2% conversion of sec-butyl benzene to carbon dioxide was achieved.

Example VI

The details of this experiment were the same as Example IV except that the dried catalyst was impregnated with sufficient barium hydroxide solution to add 5% barium oxide to the catalyst. The catalyst having 95% cobalt oxide, 5% zirconium oxide and 5% barium oxide was dried one hour at 250° C. An 84.5% conversion was obtained when the catalyst was tested at 200° C.

Example VII

The details of this experiment were the same as Example VI except that the catalyst was dried at 350° C. for one hour. A 68.1% conversion to carbon dioxide was obtained when the catalyst was tested at 200° C.

Example VIII

The details of this experiment were the same as Example VI except that the catalyst was dried at 500° C. for one hour. A 66.7% conversion to carbon dioxide was obtained when the catalyst was tested at 200° C.

Example IX

The details of this experiment were the same as Example VI except that the catalyst was dried at 600° C. for one hour. A 57.7% conversion to carbon dioxide was obtained when the catalyst was tested at 200° C.

Example X

A solution of 69.6 grams of nickel nitrate and 0.5 gram of magnesium oxide in 200 ml. of water was precipitated by the addition of an aqueous solution of 35% potassium hydroxide until the pH was 8 or 9. The precipitate was filtered, washed with water and dried for one hour at 250° C. The catalyst composition was 95% nickel oxide and 5% magnesium oxide. A 20.9% conversion of hydrocarbon to carbon dioxide was obtained when the catalyst was tested at 250° C.

Example XI

The details of the experiment were the same as in Example X except that the dried catalyst was impregnated with sufficient barium hydroxide solution to add 5% barium oxide to the catalyst. The catalyst was dried for one hour at 250° C. The catalyst composition was 90% nickel oxide, 5% magnesium oxide, and 5% barium oxide. A 45% conversion of hydrocarbon to carbon dioxide was obtained when the catalyst was tested at 250° C.

Example XII

A solution of 70.2 grams of cobalt sulfate, 534 grams of ferric sulfate, and 20.4 grams of zirconium nitrate was precipitated by the addition of sufficient aqueous solution of 35% potassium hydroxide to bring the pH to 8 or 9. The precipitate was filtered, washed with water, and for one hour, air dried at 250° C. The catalyst composition was 85% iron oxide, 10% cobalt oxide, and 5% zirconium oxide. A 29.8% conversion of hydrocarbon was obtained when the catalyst was tested at 250° C.

Example XIII

The details of this experiment were the same as in Example XII except that sufficient barium hydroxide solution was added to the dry catalyst so that the catalyst concentration was changed to 82% iron oxide, 9% cobalt oxide, 4% zirconium oxide, and 5% barium oxide. The catalyst was dried at 250° C. for one hour. A 55.1% conversion of hydrocarbon was obtained when the catalyst was tested at 250° C.

The catalysts prepared according to the examples were evaluated by determining the percent oxidation of a small amount of hydrocarbon in air. A good oxidation catalyst should convert a substantial portion of the hydrocarbon to carbon dioxide and water. A controlled amount of air was bubbled through a hydrocarbon at such a rate that it picked up a few percentage of the fuel. The hydrocarbon containing air was then passed through a small furnace containing the oxidation catalyst. The products derived from this combustion were passed off through a drying tube to remove water and a collecting tube for measuring the carbon dioxide formed. The waste gases were passed off into the atmosphere. A more detailed description of the apparatus and procedure was as follows:

Catalyst particles, 95% cobalt oxide, 5% zirconium oxide, were charged into a porcelain boat which was placed inside a 15 mm. glass tube contained within a horizontal furnace. The temperature was raised to 250° C. and allowed to remain there for one-half hour prior to the introduction of any hydrocarbon through the system to insure that the catalyst was at the temperature of the system. Air was passed through sodium hydroxide on asbestos to remove all of the carbon dioxide from it. The air was then passed through a flow meter which regulated the air rate through the system. The air rate was 22–26 liters per hour. The air after passing through the flow meter was bubbled through a weighed container having a controlled amount of secondary butylbenzene therein, and the gas now containing a small percentage of hydrocarbon was passed over the catalyst boat where it was oxidized. The gases were then passed into a calcium sulfate drying tube where the water in the system was removed. The gas was then flowed through a chamber containing sodium hydroxide on asbestos in a weighed amount to collect the carbon dioxide formed. The waste gases were exhausted to the atmosphere. The container of secondary butylbenzene had lost 1.176 grams after four hours. The carbon dioxide absorber gained 0.553 gram. With complete oxidation, 3.86 grams of carbon dioxide would have been formed. The actual conversion calculated was 14.3%.

Secondary butylbenzene was used in the testing procedure because it is difficult to oxidize. More easily oxidized materials such as gasoline or aldehydes and other oxygenated hydrocarbons would give similar or better results than those achieved with secondary butylbenzene.

The following table shows the results achieved when the catalyst prepared according to the examples were tested.

| | Oxidation Temp., °C. | Percent Oxidation | Drying Temp., °C. |
|---|---|---|---|
| $CuO-ZrO_2$ (95-5) | 250 | 14.3 | 250 |
| $CuO-ZrO_2-BaO$ (90-5-5) | 200 | 52 | 250 |
| $CuO-ZrO_2-BaO$ (90-5-5) | 200 | 72 | 350 |
| $CoO-ZrO_2$ (95-5) | 250 | 57.8 | 250 |
| $CoO-ZrO_2$ (95-5) | 250 | 25.2 | 350 |
| $CoO-ZrO_2-BaO$ (90-5-5) | 200 | 84.5 | 250 |
| $CoO-ZrO_2-BaO$ (90-5-5) | 200 | 68.1 | 350 |
| $CoO-ZrO_2-BaO$ (90-5-5) | 200 | 66.7 | 500 |
| $CoO-ZrO_2-BaO$ (90-5-5) | 200 | 57.7 | 600 |
| $NiO-MgO$ (90-5) | 250 | 20.9 | 250 |
| $NiO-MgO-BaO$ (90-5-5) | 250 | 45.0 | 250 |
| $Fe_2O_3-CoO-ZrO_2$ (85-10-5) | 250 | 29.8 | 250 |
| $Fe_2O_3-CoO-ZrO_2-BaO$ (82-9-4-5) | 250 | 55.1 | 250 |

The barium oxide is an effective promoter for catalysts comprising the oxides of cobalt, copper, nickel, and iron as can be seen from the results tabulated.

The catalyst compositions are balanced for optimum oxidation activity.

The active catalyst components, that is, the oxides of iron, cobalt, nickel, and copper are kept at as high a level as possible, 80–95%, to insure the effectiveness of the catalyst for oxidation reactions at low concentrations.

The support materials are kept in minor proportion, 3 to 10%, so that the catalyst surface area is increased without materially reducing the active component content.

The barium oxide promoter content is held at 2 to 10% because there would be no added advantage to larger amounts for improved activity. They would tend to reduce the overall catalytic action by reducing the iron, cobalt, nickel, and copper content.

The method of drying the catalyst may have a beneficial effect on the activity of the catalyst as can be seen from the copper oxide, zirconium oxide, barium oxide catalyst. This is a variable, the control of which is well within the realm of one skilled in the art and is not a necessary part of this invention.

The catalysts were tested at moderate temperatures to demonstrate their effectiveness at this level. The activity of the catalyst will increase as the temperature of the system goes up, so that, when the reaction is started, it tends to be self-propagating.

As a nonrestricting example of the use of this invention, a catalyst composed of 80 to 95% cobalt oxide, 2 to 10% zirconium oxide, and 3 to 10% barium oxide is pelletized and placed within a porous baffle of an automobile muffler. A venturi tube for drawing air into the muffler for puting oxygen into the exhaust gases is placed in the exhaust pipe of the muffler. The waste gases from the engine are diluted with air, and the residual hydrocarbon contained therein is burned to carbon dioxide and water when it comes into contact with the catalyst. The total temperature requirements for this system are considerably less than with conventional muffler catalysts. It takes less time between automobile startup and the time in which the exhaust gases are at a temperature sufficiently high to activate the oxidation catalyst.

Another example of the use of this catalyst is in the oxidation of the naphthaquinone and maleic anhydride contained in the waste gases from the oxidation of naphthalene to phthalic anhydride. Catalyst particles are placed in a vertical chamber having a porous bed which is surrounded by a heat transfer chamber for the introduction of water which is heated by the oxidation of hydrocarbons passed through the system. The waste gas line is attached to the base of this container in such a way that when the gases pass through the system the solid catalyst particles will be fluidized therein. The fluidized catalyst initiates the oxidation of the naphthaquinone and maleic anhydride contained in the waste gas to carbon dioxide and water. The liberated heat heats the water which is in turn used to heat the naphthalene entering the system.

The preceding has served to demonstrate some of the embodiments of this invention.

I claim:

A method of oxidizing the gaseous organic matter found in the exhaust fumes of an internal combustion engine comprising the steps of:
(a) diluting said exhaust fumes with air to form a gaseous mixture containing up to about one percent by volume of said organic matter, and
(b) contacting said gaseous mixture at exhaust gas temperatures with an oxidation catalyst consisting essentially of 80–95 percent by weight of an oxide of a metal selected from the group consisting of iron, cobalt, nickel, copper and mixtures thereof, 2–10 percent by weight of barium oxide, and 3–10 percent by weight of a support selected from the group consisting of alumina, magnesia, silica and zirconia.

References Cited by the Examiner
UNITED STATES PATENTS

| | | | |
|---|---|---|---|
| 1,489,497 | 4/24 | Larson | 252—473 |
| 1,836,927 | 12/31 | Linckh | 23—3.1 |
| 2,509,204 | 5/58 | Bilisoly | 252—473 X |

MAURICE A. BRINDISI, *Primary Examiner.*